US009958760B2

(12) United States Patent
Chen et al.

(10) Patent No.: US 9,958,760 B2
(45) Date of Patent: May 1, 2018

(54) PROJECTION APPARATUS WITH HEAT DISSIPATING MODULE

(71) Applicant: Coretronic Corporation, Hsin-Chu (TW)

(72) Inventors: Jhih-Hao Chen, Hsin-Chu (TW);
Yi-Siang Huang, Hsin-Chu (TW);
Wen-Yen Chung, Hsin-Chu (TW);
Tsung-Ching Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days. days.

(21) Appl. No.: 15/157,080

(22) Filed: May 17, 2016

(65) Prior Publication Data

US 2017/0038665 A1 Feb. 9, 2017

(30) Foreign Application Priority Data

Aug. 4, 2015 (TW) .............................. 104125297 A

(51) Int. Cl.
*G03B 21/16* (2006.01)
*H04N 9/31* (2006.01)
*G03B 21/20* (2006.01)

(52) U.S. Cl.
CPC ........... *G03B 21/16* (2013.01); *H04N 9/3144* (2013.01); *G03B 21/2093* (2013.01)

(58) Field of Classification Search
CPC ... G03B 21/16; G03B 21/2093; H04N 9/3144
See application file for complete search history.

(56) References Cited

U.S. PATENT DOCUMENTS

| 6,739,831 | B2* | 5/2004 | Hsu | ....................... | F04D 29/545 |
| | | | | | 353/58 |
| 7,195,388 | B2* | 3/2007 | Hori | ..................... | H04N 9/3144 |
| | | | | | 353/22 |
| 7,441,903 | B2* | 10/2008 | Kim | ..................... | H04N 9/3144 |
| | | | | | 348/748 |
| 7,510,285 | B2* | 3/2009 | Takemi | .................. | G03B 21/16 |
| | | | | | 353/57 |
| 7,648,245 | B2* | 1/2010 | Park | ...................... | G03B 21/16 |
| | | | | | 348/748 |

(Continued)

FOREIGN PATENT DOCUMENTS

| CN | 101452194 A | 6/2009 |
| CN | 101848627 A | 9/2010 |

(Continued)

*Primary Examiner* — Bao-Luan Le
(74) *Attorney, Agent, or Firm* — Li-Jen Shen

(57) ABSTRACT

A projection apparatus includes a housing, a projection module, an electronic assembly and a heat dissipating module. The housing has first to fourth sides. The first and second sides are provided with air outlet and first air inlet respectively. A containing space is defined in the housing and has first and second areas. The heat dissipating module includes first to third heat dissipating members and first to second fans. The first, second, third heat dissipating members are connected to a light source module of the projection module. The first heat dissipating member is close to the air outlet. The second heat dissipating member is in the first area. The third heat dissipating member is in the first area and close to the second air inlet.

23 Claims, 6 Drawing Sheets

(56) References Cited

U.S. PATENT DOCUMENTS

| | | | |
|---|---|---|---|
| 7,740,379 B2* | 6/2010 | Lin .................. | G03B 21/20 362/231 |
| 7,758,193 B2* | 7/2010 | Hsu .................. | G03B 21/16 353/57 |
| 7,938,544 B2* | 5/2011 | Chou ................ | H04N 9/3144 353/61 |
| 9,022,574 B2* | 5/2015 | Nishimura ......... | G03B 21/16 353/60 |
| 9,261,760 B2* | 2/2016 | Wu .................. | G03B 21/16 |
| 9,316,894 B2* | 4/2016 | Dai .................. | G03B 21/16 |
| 9,612,510 B2* | 4/2017 | Yanagihara ....... | G03B 21/16 |
| 2002/0197158 A1* | 12/2002 | Hsu .................. | F04D 29/545 416/5 |
| 2005/0122721 A1* | 6/2005 | Hori ................. | H04N 9/3144 362/268 |
| 2005/0264766 A1 | 12/2005 | Morimoto et al. | |
| 2006/0170876 A1* | 8/2006 | Takemi ............. | G03B 21/16 353/61 |
| 2006/0290895 A1* | 12/2006 | Park ................. | G03B 21/16 353/61 |
| 2007/0052930 A1* | 3/2007 | Ki .................... | H04N 9/3144 353/57 |
| 2007/0139887 A1 | 6/2007 | Lee et al. | |
| 2007/0247593 A1* | 10/2007 | Chou ................ | H04N 9/3144 353/61 |
| 2007/0258053 A1* | 11/2007 | Hsu .................. | G03B 21/16 353/58 |
| 2008/0018553 A1 | 1/2008 | Umamine et al. | |
| 2009/0135378 A1* | 5/2009 | Lin .................. | G03B 21/16 353/61 |
| 2009/0195757 A1* | 8/2009 | Chen ................ | G03B 21/16 353/58 |
| 2010/0118280 A1* | 5/2010 | Chen ................ | G03B 21/16 353/61 |
| 2011/0157560 A1* | 6/2011 | Hsiao ............... | H04N 9/3144 353/58 |
| 2012/0075595 A1* | 3/2012 | Yamamoto ....... | G03B 21/2026 353/58 |
| 2012/0176586 A1* | 7/2012 | Nishimura ......... | G03B 21/22 353/61 |
| 2014/0085612 A1* | 3/2014 | Wu .................. | G03B 21/16 353/57 |
| 2014/0092368 A1* | 4/2014 | Dai .................. | G03B 21/16 353/58 |
| 2014/0198304 A1* | 7/2014 | Sun .................. | G03B 21/16 353/61 |
| 2016/0109788 A1* | 4/2016 | Yanagihara ....... | H04N 9/3144 353/58 |

FOREIGN PATENT DOCUMENTS

| | | |
|---|---|---|
| CN | 202362578 U | 8/2012 |
| CN | 103941530 A | 7/2014 |
| TW | 201107864 A1 | 3/2011 |
| TW | I386751 B1 | 2/2013 |
| TW | I393989 B1 | 4/2013 |
| TW | I406082 B1 | 8/2013 |
| TW | I412318 B | 10/2013 |
| TW | I417634 B | 12/2013 |
| TW | I417635 B | 12/2013 |
| TW | I464521 B | 12/2014 |

* cited by examiner

PROJECTION APPARATUS WITH HEAT DISSIPATING MODULE

FIELD OF THE INVENTION

The invention relates to a display device, and more particularly to a projection apparatus.

BACKGROUND OF THE INVENTION

With advances in technology, the portable projection apparatus is getting more compact and lightweight in response to the demands from users. However, it is quite important for portable projection apparatus to develop a mean to eliminate system noise generated by the portable projection apparatus due to the distance between a portable projection apparatus and a user is relatively small while the portable projection apparatus is being used.

In addition, the position and quantity of heat-dissipating fans in the portable projection apparatus are limited due to that portable projection apparatus has a relatively smaller size. Further, it is understood that when the brightness of the projection apparatus is higher, the energy inputting into the light source is higher. Consequentially, the generated heat is increased. A portable projection apparatus may require a higher heat dissipating effect to decrease the temperature of the portable projection apparatus if the internal heat is higher. In general, when the rotational speed of fan is higher, the heat dissipating effect of the portable projection apparatus is better, however, a large noise is accompanied.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention is directed to a projection apparatus having reduced noises and improved heat dissipating effect.

Other objectives and advantages of the invention can be further illustrated by the technical features broadly embodied and described as follows.

In order to achieve one or a portion of or all of the above advantages or other advantages, a projection apparatus is proposed according to an embodiment of the invention. The projection apparatus includes a housing, a projection module, an electronic assembly and a heat dissipating module. The housing has a first side, a second side, a third side and a fourth side. The first side and the second side are opposite to each other, and the third side and the fourth side are opposite to each other. The third side and the fourth side are formed between the first side and the second side. The first side is provided with an air outlet, and the second side is provided with a first air inlet. A containing space is defined in the housing and has a first area and a second area adjacent to the first area. The first area is formed close to the third side, and the second area is formed close to the fourth side. The housing is provided with a second air inlet in the first area. The projection module is disposed in the housing and configured to project an image beam onto a display area. The projection module includes a light source module. The electronic assembly is disposed in the housing and electrically connected to the projection module. The electronic assembly is configured to drive the projection module. The heat dissipating module includes a first heat dissipating member, a second heat dissipating member, a third heat dissipating member, a first fan and a second fan. The first heat dissipating member, the second heat dissipating member and the third heat dissipating member are connected to the light source module. The first heat dissipating member is disposed close to the air outlet. The second heat dissipating member is disposed in the first area. The third heat dissipating member is disposed in the first area and close to the second air inlet. The first fan is disposed in the first area and between the light source module and the first heat dissipating member. The second fan is disposed in the second area and between the electronic assembly and the first heat dissipating member.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The invention becomes more readily apparent to those ordinarily skilled in the art after reviewing the following detailed description and accompanying drawings, in which.

DETAILED DESCRIPTION OF PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
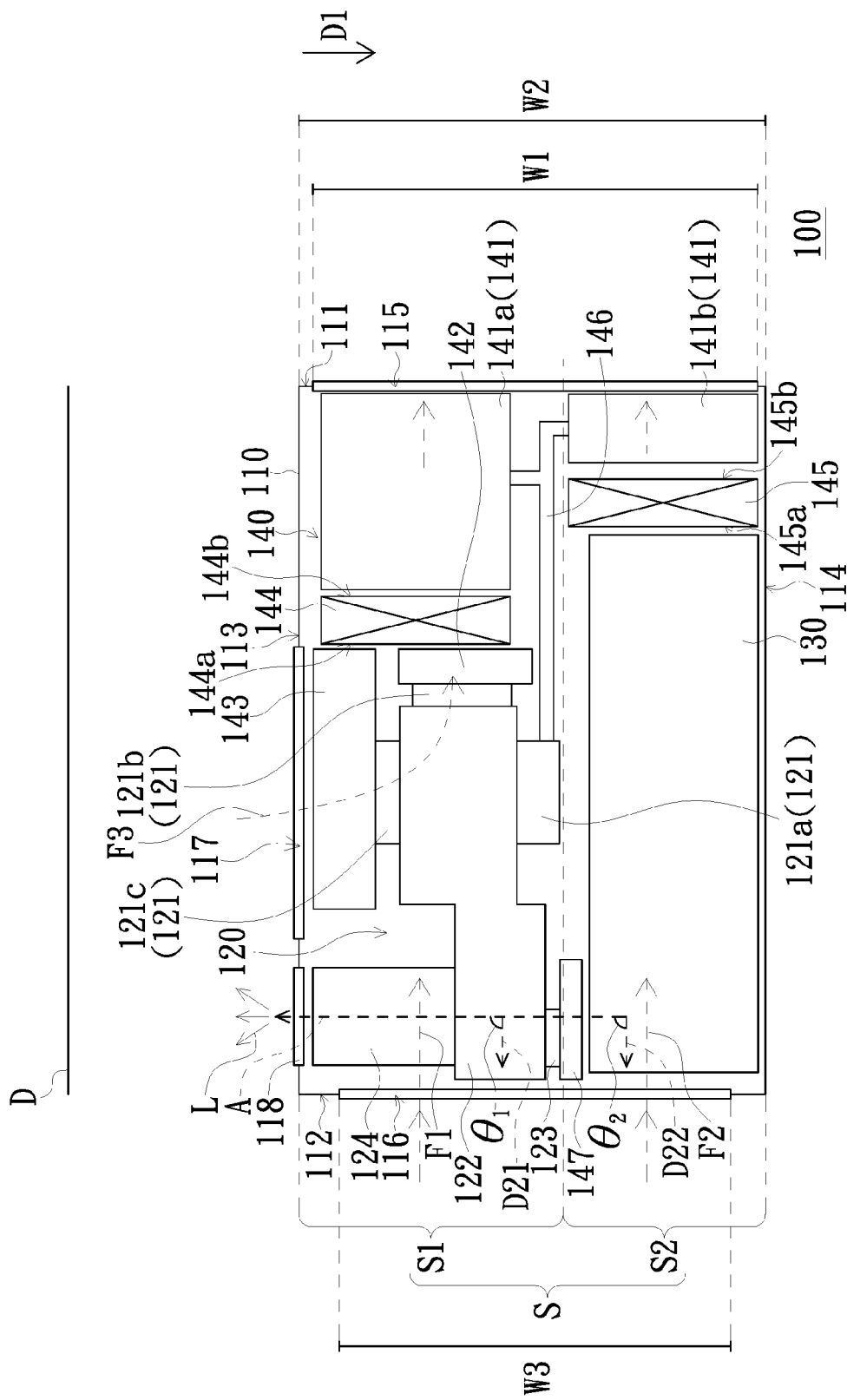
FIG. 1 is a schematic top view of a projection apparatus in accordance with an embodiment of the invention.

FIG. 1 is a schematic top view of a projection apparatus in accordance with an embodiment of the invention. Referring to FIG. 1, the projection apparatus 100 of the embodiment includes a housing 110, a projection module 120, an electronic assembly 130 and a heat dissipating module 140. The housing 110 has a first side 111, a second side 112, a third side 113 and a fourth side 114, wherein the first side 111 and the second side 112 are opposite to each other and the third side 113 and the fourth side 114 are opposite to each other. The third side 113 and the fourth side 114 are formed between the first side 111 and the second side 112. The first side 111 is provided with an air outlet 115 and the second side 112 is provided with a first air inlet 116.

A containing space S is defined in the housing 110 and has a first area S1 and a second area S2 (the two areas are distinguished schematically by dash lines in FIG. 1, but the invention is not limited thereto). The first area S1 is formed close to the third side 113 and the second area S2 is formed close to the fourth side 114. In the embodiment, the housing 110 is further formed with a second air inlet 117 in the first area S1. Specifically, the second air inlet 117 is, for example, provided on the third side 113. In one embodiment, the air outlet 115, the first air inlet 116 and the second air inlet 117 may have grid, sieve, mesh or other suitable structures. In another embodiment, the air outlet 115, the first air inlet 116 and the second air inlet 117 may have structures able to be open or close. It is to be noted that the structures of the air outlet 115, the first air inlet 116 and the second air inlet 117 are not limited in the invention.

The projection module 120 is disposed in the housing 110 and is located substantially in the first area S1. In other words, some components of the projection module 120 may be located in the second area S2. In the embodiment, the projection module 120 includes a light source module 121, an optical engine 122, a light valve 123 and a projection lens 124. The second air inlet 117 is located, for example, near the light source module 121. The light source module 121 is configured to provide an illumination beam. The optical engine 122 is configured to transmit the illumination beam emitted from the light source module 121 to the light valve 123. In response to actual requirements, the optical engine 122 may include a plurality of optical elements, such as light integrators, lens, prisms, reflectors, dichroic mirrors, etc., and the invention is not limited thereto. The light valve 123 is configured to convert the illumination beam into an image beam L, and consequentially the projection module 120 projects the image beam L onto a display area D. The display area D may be a projection screen or wall. The light valve 123 is a reflective light valve, such as a digital micro-mirror device (DMD) or a liquid crystal on silicon panel (LCoS Panel). In another embodiment, the light valve 123 may be a transmissive light valve or other appropriate light valve. In addition, it is understood that the relative positions of the optical engine 122, the light valve 123 and the projection lens 124 need to be adjusted according to the type of the light valve 123. The invention is not limited thereto.

In the embodiment, the third side 113 is provided with a lens opening 118 and the projection lens 124 is disposed on a transmission path of the image beam L. Therefore, the image beam L is projected onto the display area D sequentially through the projection lens 124 and the lens opening 118. The lens opening 118 is located on a side of the second air inlet 117 and the projection lens 124 is located closer to the first air inlet 116 than the air outlet 115. The projection apparatus 100 is prevented from reducing imaging quality caused by the thermal turbulent flow generated from the air outlet 115.

The electronic assembly 130 is disposed in the housing 110 and is located substantially in the second area S2. In other words, some components of the electronic assembly 130 may be located in the first area S1. The electronic assembly 130 may include electronic components such as printed circuit boards, liquid capacitors, voltage components, inductors and power supply units, etc. The electronic assembly 130 is electrically coupled to the projection module 120 and is configured to drive the projection module 120 to project the image beam L.

In the embodiment, the heat dissipating module 140 includes a first heat dissipating member 141, a second heat dissipating member 142, a third heat dissipating member 143, a first fan 144 and a second fan 145. The first heat dissipating member 141, the second heat dissipating member 142 and the third heat dissipating member 143 are metal fins or metal heat dissipating pads, etc., and the invention is not limited thereto. The first heat dissipating member 141, the second heat dissipating member 142 and the third heat dissipating member 143 may be thermally connected to the light source module 121 to perform heat dissipation for the light source module 121.

In the embodiment, the light source module 121 includes a first light emitting element 121a, a second light emitting element 121b and a third light emitting element 121c. The first light emitting element 121a is disposed between the optical engine 122 and the electronic assembly 130, the second light emitting element 121b is disposed between the optical engine 122 and the first fan 144, and the third light emitting element 121c is disposed between the optical engine 122 and the third side 113. Each of the first light emitting element 121a, the second light emitting element 121b and the third light emitting element 121c may be a red light emitting element, a green light emitting element or a blue light emitting element respectively. For example, the first light emitting element 121a is a green light emitting diode, the second light emitting element 121b is a blue light emitting diode, and the third light emitting element 121c is a red light emitting diode, however, the invention is not limited thereto. In another embodiment, the first light emitting element 121a, the second light emitting element 121b and the third light emitting element 121c may be other suitable light sources such as laser diodes.

In the embodiment as shown in FIG. 1, the first heat dissipating member 141 may be thermally connected to the first light emitting element 121a, the second heat dissipating member 142 may be thermally connected to the second light emitting element 121b, and the third heat dissipating member 143 may be thermally connected to the third light emitting element 121c. It should be understood that the green light emitting diode may produce more heat during a light emitting process. Therefore, the first heat dissipating member 141 connected to the first light emitting element 121a may include at least two separated sub heat dissipating members 141a, 141b in the embodiment. However, in another embodiment, the first heat dissipating member 141 may have one integrated structure and the type of the first heat dissipating member 141 is not limited in the invention. The sub heat dissipating members 141a, 141b may be disposed in the first area S1 and the second area S2, respectively. The first sub heat dissipating member 141a is disposed in the first area S1 and the second sub heat dissipating member 141b is disposed in the second area S2, however, the invention is not limited thereto.

The heat dissipating module 140 may further include at least one heat pipe 146. The heat pipe 146 may be made by the metal with higher thermal conductivity, such as silver, copper and aluminum, etc. At least one of the first heat dissipating member 141, the second heat dissipating member 142 and the third heat dissipating member 143 is connected to the respective light emitting element through the heat pipe 146. In the embodiment, for example, the first heat dissipating member 141 is disposed close to the air outlet 115 and the sub heat dissipating members 141a, 141b are connected to the first light emitting element 121a through the heat pipe 146. Therefore, the heat produced by the first light emitting element 121a can be transmitted to the sub heat dissipating members 141a, 141b for heat dissipation.

The second heat dissipating member 142 is disposed in the first area S1. In the embodiment, specifically, the second heat dissipating member 142 is disposed between the second light emitting element 121b and the first fan 144. The third heat dissipating member 143 is disposed in the first area S1 and close to the second air inlet 117. Therefore, the third heat dissipating member 143 can perform heat dissipation by using the airflow flowing through the second air inlet 117.

The first fan 144 is disposed in the first area S1 and between the light source module 121 and the first sub heat dissipating member 141a. The second fan 145 is disposed in the second area S2 and between the electronic assembly 130 and the second sub heat dissipating member 141b. The noises generated by the first fan 144 and the second fan 145 in operating are prevented from being directly transmitted out through the air outlet 115 due to the first sub heat dissipating member 141a disposed between the first fan 144 and the air outlet 115 and the second sub heat dissipating member 141b disposed between the second fan 145 and the air outlet 115. Therefore, the noises generated by the projection apparatus 100 in operating are reduced effectively.

The first fan 144 has an air-inlet surface 144a and an air-outlet surface 144b. The air-inlet surface 144a faces the first air inlet 116 and the air-out surface 144b faces the air outlet 115. Therefore, a first cooling airflow F1 (depicted in dashed-line arrow in FIG. 1) is formed in the first area S1 when the first fan 144 is in operating. The first cooling airflow F1 mainly flows through the first area S1 and then flows to the air outlet 115 after flowing into the housing 110 through the first air inlet 116. Specifically, the first cooling airflow F1 sequentially flows through the projection module 120, the second heat dissipating member 142 and the third heat dissipating member 143 which are disposed between the first air inlet 116 and the first fan 144 after flowing into the housing 110 through the first air inlet 116. The first cooling airflow F1 flows through the first sub heat dissipating member 141a and then flows to the air outlet 115 after flowing through the first fan 144.

The second fan 145 has an air-inlet surface 145a and an air-outlet surface 145b. The air-inlet surface 145a faces the first air inlet 116 and the air-outlet surface 145b faces the air outlet 115. Therefore, a second cooling airflow F2 (depicted in dashed-line arrow in FIG. 1) is formed in the second area S2 when the second fan 145 is in operating. The second cooling airflow F2 mainly flows through the second area S2 and then flows to the air outlet 115 after flowing into the housing 110 through the first air inlet 116. The airflow interference between the two cooling airflows are prevented with each other and an unsmooth air flowing is avoided consequentially due to the first cooling airflow F1 mainly flows through the first area S1 and the second cooling airflow F2 mainly flows through the second area S2, thereby the heat dissipating effect is enhanced.

The first area S1 substantially corresponds to the area where the first cooling airflow F1 mainly flows and the second area S2 substantially corresponds to the area where the second cooling airflow F2 mainly flows, wherein the first cooling airflow F1 is generated by the first fan 144 and the second cooling airflow F2 is generated by the second fan 145. In the embodiment, the third side surface 113 is further provided with the second air inlet 117, a third cooling airflow F3 (depicted in dashed-line arrow in FIG. 1) is formed in the first area S1 when the first fan 144 is in operating. The third cooling airflow F3 mainly flows through the first area S1 and then flows to the air outlet 115 after flowing into the housing 110 through the second air inlet 117. Specifically, the third cooling airflow F3 sequentially flows through the second heat dissipating member 142, the third heat dissipating member 143, and passes through the first fan 144 together with the first cooling airflow F1 after flowing into the housing 110 through the second air inlet 117, and then flows out through the air outlet 115. The third cooling airflow F3 can also perform heat dissipation for the third heat dissipating member 143, thus, the projection apparatus 100 of the embodiment has enhanced heat dissipating effect.

The noises generated by the first fan 144 and the second fan 145 in operating are prevented from being directly transmitted out through the air outlet 115 due to the first sub heat dissipating member 141a of the first heat dissipating member 141 disposed between the first fan 144 and the air outlet 115 and there is the second sub heat dissipating member 141b of the first heat dissipating member 141 disposed between the second fan 145 and the air outlet 115. Therefore, the noises generated by the projection apparatus 100 in operating are reduced effectively. In addition, the first cooling airflow F1 generated by the first fan 144 mainly flows through the first area S1 and the second cooling airflow F2 generated by the second fan 145 mainly flows through the second area S2. The airflow interference between the first cooling airflow F1 and the second cooling airflow F2 is prevented from each other, and consequentially, an unsmooth airflow flowing is avoided, thereby enhancing the heat dissipating effect.

In the embodiment as shown in FIG. 1, the heat dissipating module 140 further includes a fourth heat dissipating member 147. The fourth heat dissipating member 147 may be thermally connected to the light valve 123 and disposed close to the first air inlet 116 to perform heat dissipation for the light valve 123. The second cooling airflow F2 sequentially flows through the fourth heat dissipating member 147, the electronic assembly 130 and then flows to the second fan 145 after flowing into the housing 110 through the first air inlet 116. The second cooling airflow F2 flows through the second sub heat dissipating member 141b and then flows out through the air outlet 115.

In the embodiment, the width W1 of the air outlet 115 in a direction D1 is equal to or smaller than the distance W2. The direction D1 is defined as a direction from the third side 113 to the fourth side 114. The distance W2 is between the third side 113 and the fourth side 114. Specifically, the width W1 of the air outlet 115 is smaller than the distance W2 between the third side 113 and the fourth side 114. Additionally, in the embodiment, the width W3 of the first air inlet 116 in the direction D1 is not greater than the width W1 of the air outlet 115. Specifically, the width W3 of the first air inlet 116 is smaller than the width W1 of the air outlet 115. Thus, the airflow flowing into the housing 110 through the first air inlet 116 and the second air inlet 117 can be eliminated completely through the air outlet 115.

In the embodiment, an angle θ1 is formed between an optical axis A of the projection lens 124 (i.e., the transmitting direction of the image beam L) and the normal direction D21 of the air-inlet surface 144a of the first fan 144 (the normal direction D21 is, for example, toward the first air inlet 116, but the invention is not limited thereto), wherein the angle θ1 is ranged from 0 degree to 90 degrees. An angle θ2 is formed between the optical axis A of the projection lens 124 and the normal direction D22 of the air-inlet surface 145a of the second fan 145 (the normal direction D22 is, for example, toward the first air inlet 116, but the invention is not limited thereto), wherein the angle θ2 is ranged from 0 degree to 90 degrees. Specifically, as shown in FIG. 1, the air-inlet surface 144a of the first fan 144 is parallel to the air-inlet surface 145a of the second fan 145 and both of the angles θ1, θ2 are 90 degrees, however, the invention is not limited thereto. In addition, the projection lens 124 may locate at various positions according to disposing positions of the other elements in the housing 110, the air-inlet surface 144a of the first fan 144 is not necessary to be parallel to the air-inlet surface 145a of the second fan 145, and the lens opening 118 is not necessary to be disposed on the third side 113. According to the different location of the projection lens 124, the first area S1 and the second area S2 may be compact so as to improve heat dissipation.

Figure 2:
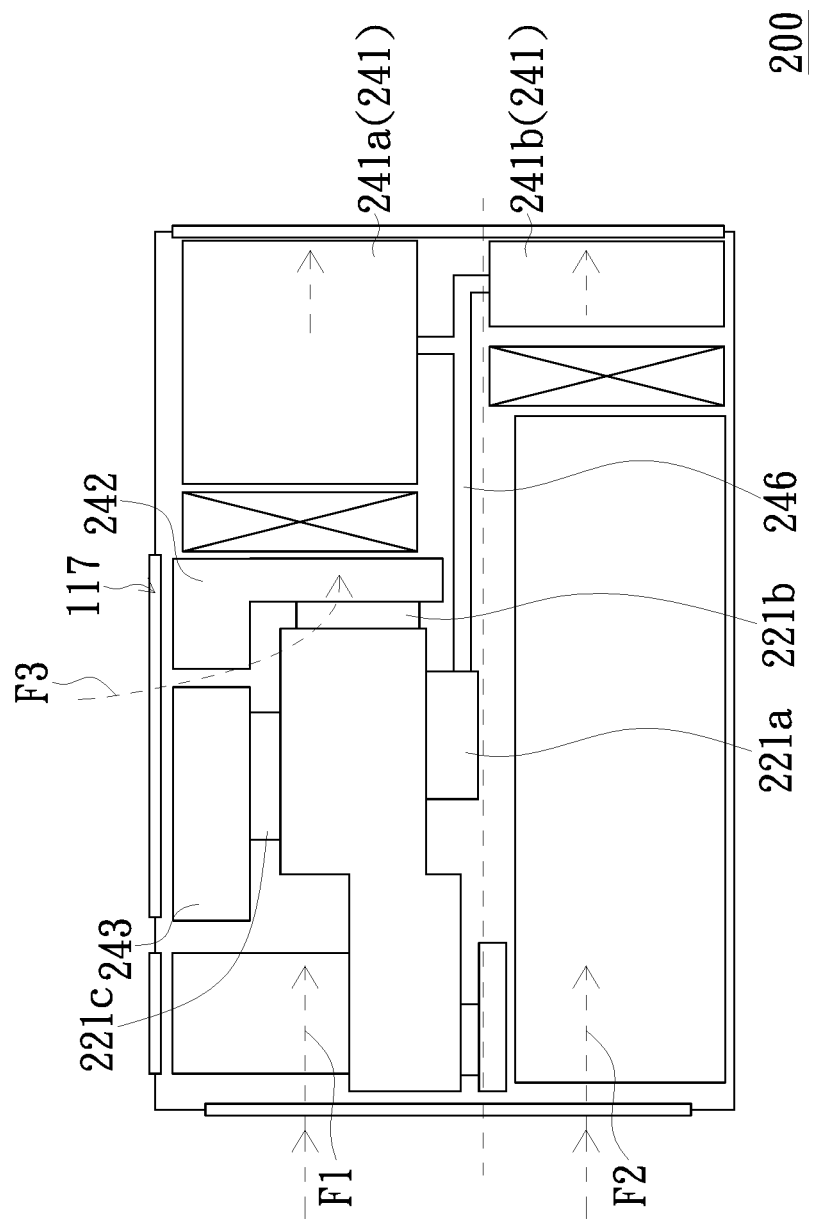
FIG. 2 is a schematic top view of a projection apparatus in accordance with another embodiment of the invention.

FIG. 2 is a schematic top view of a projection apparatus in accordance with another embodiment of the invention. Referring to FIG. 2, the projection apparatus 200 in the embodiment has structure and advantages similar to those of the aforementioned projection apparatus 100, and structural features in FIG. 2 that are identical to those shown in FIG. 1 are labeled with the same numberings for simplification. In the projection apparatus 200 of the embodiment, for example, the first light emitting element 221a is a green light emitting diode, the second light emitting element 221b is a red light emitting diode, and the third light emitting element 221c is a blue light emitting diode. The first heat dissipating member 241 may be thermally connected to the first light emitting element 221a through the heat pipe 246, the second heat dissipating member 242 may be thermally connected to the second light emitting element 221b, and the third heat dissipating member 243 may be thermally connected to the third light emitting element 221c.

A difference between the aforementioned projection apparatus 200 and the projection apparatus 100 lies in that the second heat dissipating member 242 in the projection apparatus 200 is disposed close to the third heat dissipating member 243 and the second air inlet 117. In general, the optical effect of the red light emitting diode may be more easily affected by temperature during light emitting process, therefore, the red light emitting diode may have a lower temperature resistance than the green and blue light emitting diodes. Thus, in the embodiment, one end of the second heat dissipating member 242 connected to the second light emitting element 221b is close to both of the second air inlet 117 and the third heat dissipating member 243. Consequentially, the third cooling airflow F3 flowing through the second air inlet 117 can flow through both of the second heat dissipating member 242 and the third heat dissipating member 243, and then the third airflow is confluent with the first cooling airflow F1. As a result, the third cooling airflow F3 can perform a heat dissipation for both of the second heat dissipating member 242 and the third heat dissipating member 243. Furthermore, in the embodiment, one end of the second heat dissipating member 242 can be designed to have an L-shaped structure to increase the contacting area with the third cooling airflow F3, but the invention is not limited thereto.

Figure 3:
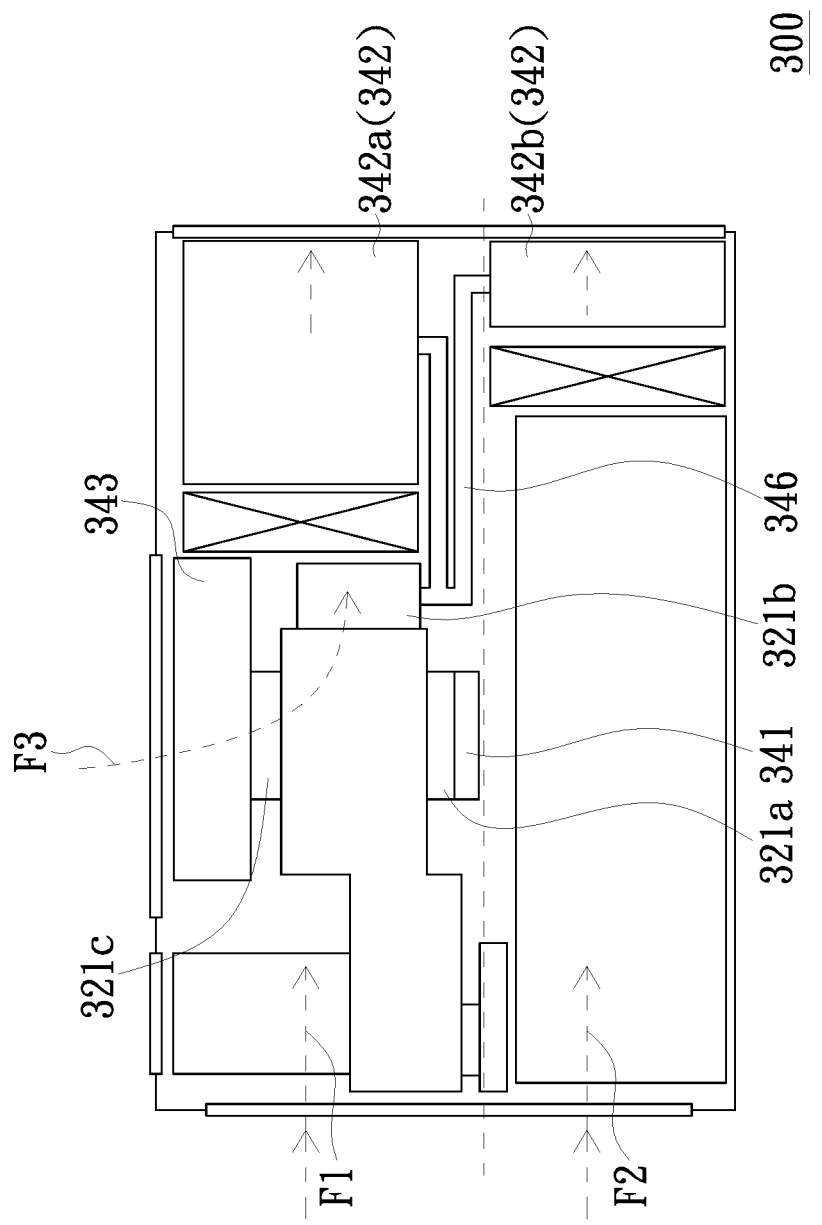
FIG. 3 is a schematic top view of a projection apparatus in accordance with another embodiment of the invention.

FIG. 3 is a schematic top view of a projection apparatus in accordance with another embodiment of the invention. Referring to FIG. 3, the projection apparatus 300 in the embodiment has structure and advantages similar to those of the aforementioned projection apparatuses 100, 200 and structural features in FIG. 3 that are identical to those shown in FIGS. 1, 2 are labeled with the same numberings for simplification. A difference between the aforementioned projection apparatuses 100, 200 and the projection apparatus 300 of the embodiment lies in that the first light emitting element 321a is a blue light emitting diode, the second light emitting element 321b is a green light emitting diode, and the third light emitting element 321c is a red light emitting diode. As shown in FIG. 3, the first heat dissipating member 341 may be thermally connected to the first light emitting element 321a, the second heat dissipating member 342 may include two sub heat dissipating members 342a, 342b, which are thermally connected to the second light emitting element 321b through the heat pipe 346, and the third heat dissipating member 343 may be thermally connected to the third light emitting element 321c.

Figure 4:
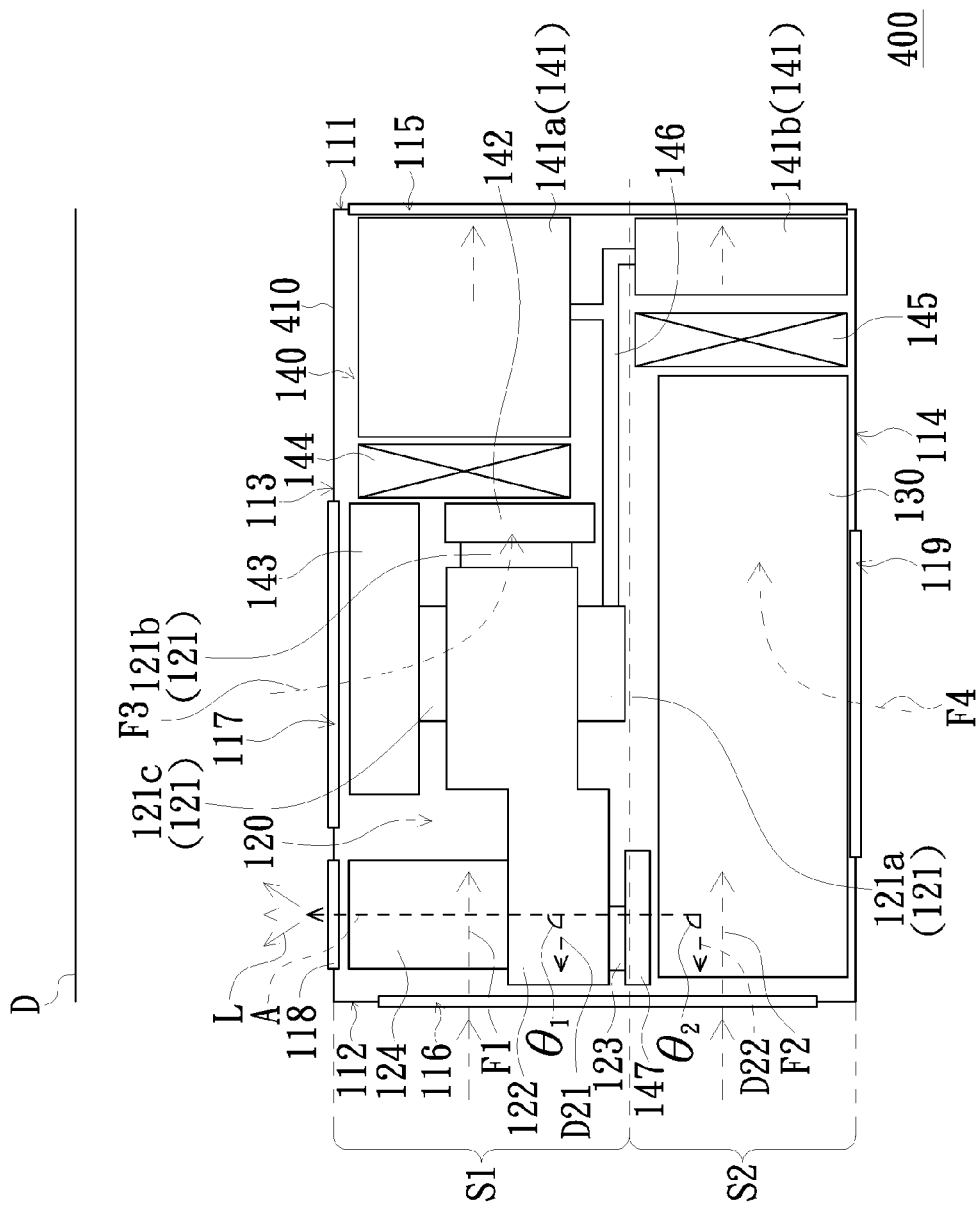
FIG. 4 is a schematic top view of a projection apparatus in accordance with another embodiment of the invention.

FIG. 4 is a schematic top view of a projection apparatus in accordance with another embodiment of the invention. Referring to FIG. 4, the projection apparatus 400 in the embodiment has structure and advantages similar to those of the aforementioned projection apparatuses 100, 200, 300, and structural features in FIG. 4 that are identical to those shown in FIGS. 1, 2, 3 are labeled with the same numberings for simplification. A difference between the aforementioned projection apparatuses 100, 200, 300 and the projection apparatus 400 in the embodiment lies in that the housing 410 further includes a third air inlet 119. Specifically, the third air inlet 119 is located in the second area S2 and is formed, for example, on the fourth side 114. Therefore, a fourth cooling airflow F4 is formed in the second area S2 when the second fan 145 is in operating. After flowing into the housing 410 through the third air inlet 119, the fourth cooling airflow F4 flows through the electronic assembly 130 and then the fourth cooling airflow F4 is confluent with the second cooling airflow F2. The fourth cooling airflow F4 and the second cooling airflow F2 flow through the second fan 145 together and then flow to the air outlet 115. As a result, the heat dissipating effect on the electronic assembly 130 is enhanced.

Figure 5:
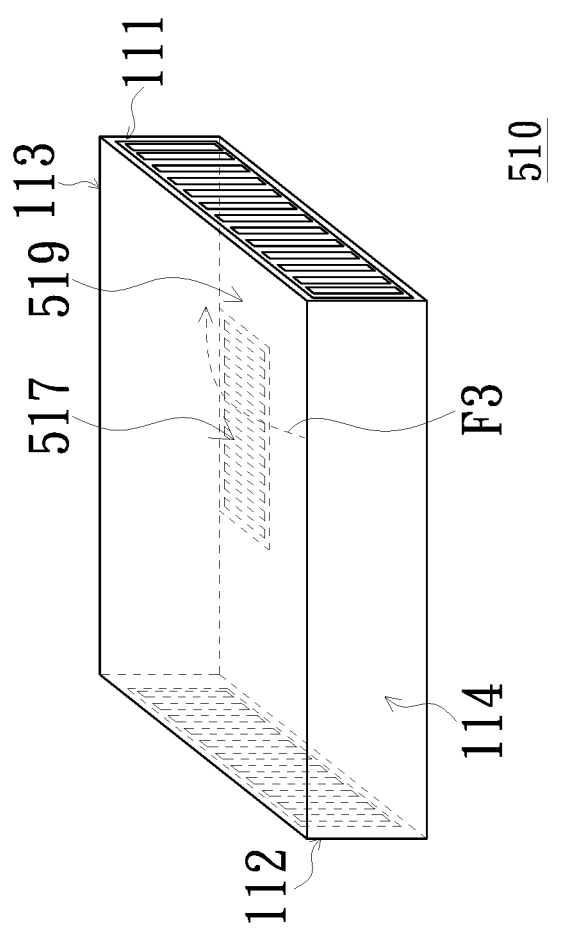
FIG. 5 is a schematic view of a housing of a projection apparatus in accordance with another embodiment of the invention.

In the above embodiments, the second air inlet 117 in the first area S1 is disposed on the third side 113, however, the similar effect is also achieved by disposing the second air inlet 117 on a bottom surface of the housing 110 in another embodiment. FIG. 5 is a schematic view of a housing of a projection apparatus in accordance with another embodiment of the invention. Referring to FIG. 5, the housing 510 in the embodiment has a structure similar to those of the housings of the above projection apparatuses. A difference between the housing 510 and the above projection apparatuses lies in that the housing 510 further has a bottom surface 519, which is connected to the first side 111, the second side 112, the third side 113 and the fourth side 114. The second air inlet 517 is formed on the bottom surface 519 and close to the third side 113. Therefore, the third cooling airflow F3 can flow into the housing 510 through the second air inlet 517 formed on the bottom surface 519 of the housing 510. In the above projection apparatus 400 of FIG. 4, it is to be noted that the third air inlet 119 may be also provided on the bottom surface 519 (not shown in FIG. 4), so that the fourth cooling airflow F4 can flow into the housing 510 through the bottom surface 519.

Figure 6:
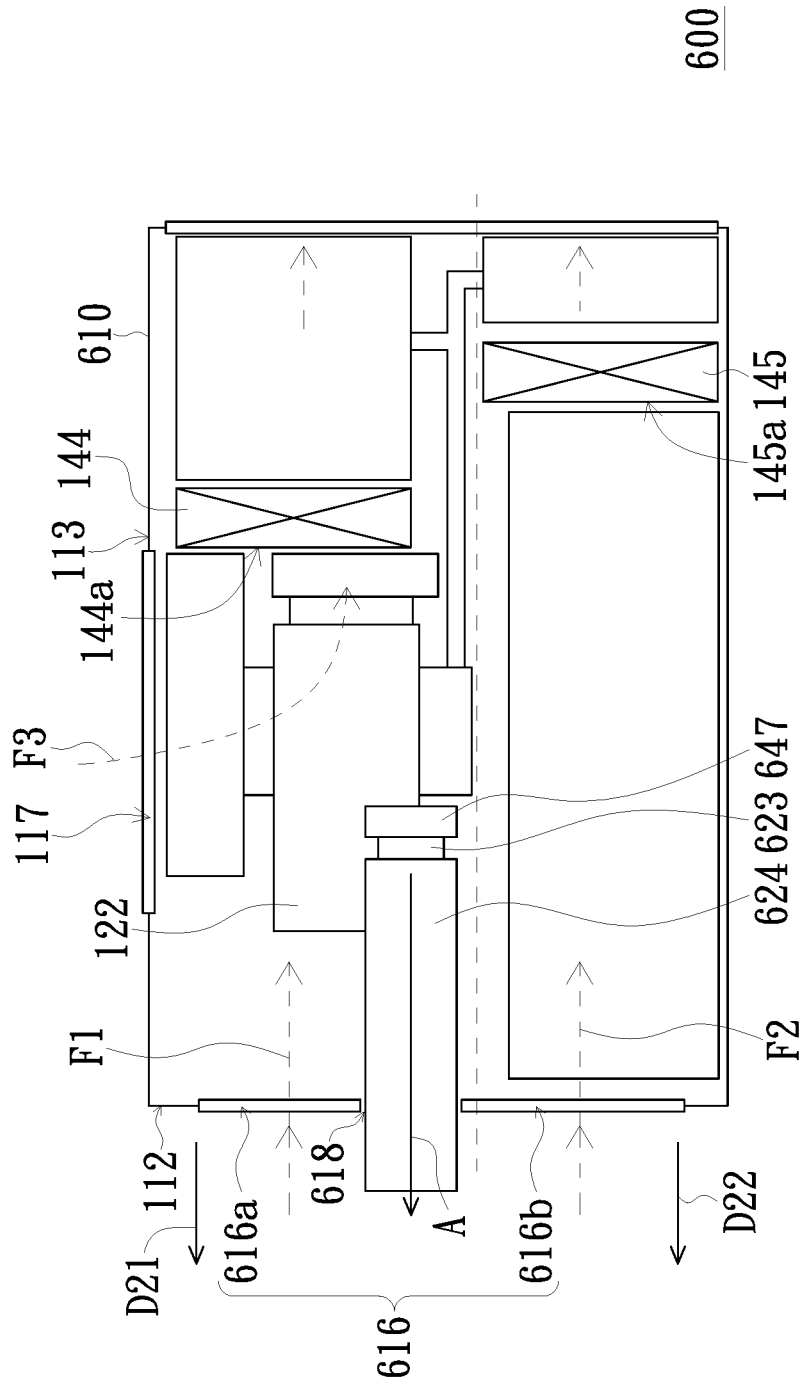
FIG. 6 is a schematic top view of a projection apparatus in accordance with another embodiment of the invention.

In the above embodiments, the lens opening 118 is exemplified by being disposed on the third side 113, however, the invention is not limited thereto. FIG. 6 is a schematic top view of a projection apparatus in accordance with another embodiment of the invention. Referring to FIG. 6, the projection apparatus 600 in the embodiment has structure and advantages similar to those of the projection apparatuses 100, 200, 300, 400, and structural features in FIG. 6 that are identical to those shown in FIGS. 1, 2, 3, 4 are labeled with the same numberings for simplification. A difference between the aforementioned projection apparatuses 100, 200, 300, 400 and the projection apparatus 600 of the embodiment lies in that the lens opening 618 is provided on the second side 112 and the image beam (not shown in FIG. 6) is projected onto the display area (not shown in FIG. 6) through the lens opening 618. The lens opening 618 may divide the first air inlet 616 into two sub air inlets 616a, 616b. Therefore, both of the first cooling airflow F1 and the second cooling airflow F2 flowing into the housing 610 through the first air inlet 616 can perform a heat dissipation for the fourth heat dissipating member 647 thermally connected to the light valve 623. The projection lens 624 unveils the housing 610 through the lens opening 618. In another embodiment, the projection lens 624 is completely disposed in the housing 610 and the image-projection end of the projection lens 624 faces the lens opening 618. In the embodiment, the air-inlet surface 144a of the first fan 144 is parallel to the air-inlet surface 145a of the second fan 145, the optical axis A of the projection lens 624 is parallel to the normal direction D21 of the air-inlet surface 144a of the first fan 144 and also parallel to the normal direction D22 of the air-inlet surface 145a of the second fan 145 (that is, both of the angle between the optical axis A and the normal direction D21 and the angle between the optical axis A and the normal direction D22 are 0 degree), however, the invention is not limited thereto. In another embodiment, the air-inlet surface 144a of the first fan 144 is not necessary to be parallel to the air-inlet surface 145a of the second fan 145, and the optical axis A may have different directions by selectively disposing a mirror in the projection lens 624, so that both of the angle between the optical axis A and the normal direction D21 and the angle between the optical axis A and the normal direction D22 can be ranged from 0 degree to 90 degrees. As a result, the projection lens 624 is prevented to obstruct the first cooling airflow F1 and the second cooling airflow F2, therefore, the first cooling airflow F1 can flow to the heat dissipating module 140 more smoothly. Further, in the projection apparatus 600 of the embodiment, the second air inlet 117 may be provided on the bottom surface (not shown in FIG. 6) of the housing 610 instead of being provided on the third side 113, and the housing 610 may be selectively disposed with the third air inlet in the aforementioned embodiments, but the invention is not limited thereto.

In summary, the noises generated by the first fan and the second fan in operating are prevented from being directly transmitted out through the air outlet by arranging the first fan and the second fan not directly close to the air outlet and disposing the first heat dissipating member between the air outlet and the first and second fans. Therefore, the noises generated by the projection apparatus in operating of the invention are reduced effectively. In addition, the airflow interference between the first cooling airflow and the second cooling airflow respectively generated by the first fan and the second fan in the projection apparatus is prevented from each other. Consequentially, an unsmooth airflow flowing is avoided and the heat dissipating effect of the invention is enhanced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:
1. A projection apparatus, comprising:
a housing, having a first side, a second side, a third side and a fourth side, wherein the first side and the second side are opposite to each other, the third side and the fourth side are opposite to each other, the third side and the fourth side are formed between the first side and the second side, the first side is provided with an air outlet, the second side is provided with a first air inlet, a containing space is defined in the housing and has a first area and a second area adjacent to the first area, the first area is formed close to the third side, the second area is formed close to the fourth side, and the housing is provided with a second air inlet in the first area;

a projection module, disposed in the housing and configured to project an image beam onto a display area, wherein the projection module comprises a light source module;

an electronic assembly, disposed in the housing and electrically connected to the projection module, wherein the electronic assembly is configured to drive the projection module; and a heat dissipating module, comprising a first heat dissipating member, a second heat dissipating member, a third heat dissipating member, a first fan and a second fan, wherein the first heat dissipating member, the second heat dissipating member and the third heat dissipating member are connected to the light source module, the first heat dissipating member is disposed close to the air outlet, the second heat dissipating member is disposed in the first area, the third heat dissipating member is disposed in the first area and close to the second air inlet, the first fan is disposed in the first area and between the light source module and the first heat dissipating member, and the second fan is disposed in the second area and between the electronic assembly and the first heat dissipating member;

wherein the first heat dissipating member disposed between the first fan and the air outlet and disposed between the second fan and the air outlet, and there is no fan between the first heat dissipating member and the outlet.

2. The projection apparatus according to claim 1, wherein the first fan forms a first cooling airflow in the first area, and the first cooling airflow flows into the housing through the first air inlet and then flows to the air outlet, wherein the second fan forms a second cooling airflow in the second area, and the second cooling airflow flows into the housing through the first air inlet and then flows to the air outlet.

3. The projection apparatus according to claim 2, wherein the first fan further forms a third cooling airflow, and the third cooling airflow flows into the housing through the second air inlet and the third cooling airflow is confluent with the first cooling airflow.

4. The projection apparatus according to claim 3, wherein the second air inlet is formed on the third side.

5. The projection apparatus according to claim 3, wherein the housing further has a bottom surface, and the bottom surface is connected to the first side, the second side, the third side and the fourth side, and the second air inlet is formed on the bottom surface and close to the third side.

6. The projection apparatus according to claim 3, wherein the third cooling airflow flows through the third heat dissipating member after flowing into the housing through the second air inlet, and then the third cooling airflow is confluent with the first cooling airflow.

7. The projection apparatus according to claim 3, wherein the third cooling airflow is confluent with the first cooling airflow in front of the first fan.

8. The projection apparatus according to claim 3, wherein the second heat dissipating member is disposed close to the third heat dissipating member and the second air inlet, wherein the third cooling airflow flows through the second heat dissipating member and the third heat dissipating member after flowing into the housing through the second air inlet, and then the third airflow is confluent with the first cooling airflow.

9. The projection apparatus according to claim 2, wherein the housing further has a third air inlet formed on the fourth side, the second fan further forms a fourth cooling airflow, and the fourth cooling airflow flows into the housing through the third air inlet and then the fourth airflow is confluent with the second cooling airflow.

10. The projection apparatus according to claim 9, wherein the fourth cooling airflow flows through the electronic assembly after flowing into the housing through the third air inlet, and then the fourth cooling airflow is confluent with the second cooling airflow.

11. The projection apparatus according to claim 9, wherein the fourth cooling airflow is confluent with the second cooling airflow in front of the second fan.

12. The projection apparatus according to claim 1, wherein the light source module comprises a first light emitting element, a second light emitting element and a third light emitting element, wherein the first heat dissipating member is connected to the first light emitting element, the second heat dissipating member is connected to the second light emitting element, and the third heat dissipating member is connected to the third light emitting element.

13. The projection apparatus according to claim 12, wherein at least one of the plurality of heat dissipating members is connected to the respective light emitting element through at least one heat pipe, the first light emitting element is a green light emitting element, the second light emitting element is a blue light emitting element, and the third light emitting element is a red light emitting element.

14. The projection apparatus according to claim 13, wherein the first heat dissipating member comprises at least two sub heat dissipating members which are disposed in the first area and the second area respectively, and each one of the at least two sub heat dissipating members is connected to the first light emitting element through at least one heat pipe.

15. The projection apparatus according to claim 1, wherein the projection module further comprises:
    an optical engine, configured to form an illumination beam from a light emitted from the light source module;
    a light valve, disposed on a transmission path of the illumination beam and configured to convert the illumination beam into the image beam; and
    a projection lens, disposed on a transmission path of the image beam.

16. The projection apparatus according to claim 15, wherein the heat dissipating module further comprises a fourth heat dissipating member, the fourth heat dissipating member is connected to the light valve and close to the first air inlet.

17. The projection apparatus according to claim 15, wherein an angle formed between an optical axis of the projection lens and a normal direction of an air-inlet surface of the first fan is ranged from 0 degree to 90 degrees.

18. The projection apparatus according to claim 15, wherein an angle formed between an optical axis of the projection lens and a normal direction of an air-inlet surface of the second fan is ranged from 0 degree to 90 degrees.

19. The projection apparatus according to claim 15, wherein the third side is further provided with a lens opening, the lens opening is located near the second air inlet, the projection lens is close to the first air inlet, and the image beam is projected onto the display area through the lens opening.

20. The projection apparatus according to claim 15, wherein the second side is further provided with a lens opening, and the image beam is projected onto the display area through the lens opening.

21. A projection apparatus, comprising:
a housing, having a first side, a second side, a third side and a fourth side, wherein the first side and the second side are opposite to each other, the third side and the fourth side are opposite to each other, the third side and the fourth side are formed between the first side and the second side, the first side is provided with an air outlet, the second side is provided with a first air inlet, a containing space is defined in the housing and has a first area and a second area adjacent to the first area, the first area is formed close to the third side, the second area is formed close to the fourth side, and the housing is provided with a second air inlet in the first area;
a projection module, disposed in the housing and configured to project an image beam onto a display area, wherein the projection module comprises a light source module;
an electronic assembly, disposed in the housing and electrically connected to the projection module, wherein the electronic assembly is configured to drive the projection module; and
a heat dissipating module, comprising a first heat dissipating member, a second heat dissipating member, a third heat dissipating member, a first fan and a second fan, wherein the first heat dissipating member, the second heat dissipating member and the third heat dissipating member are connected to the light source module, the first heat dissipating member is disposed close to the air outlet, the second heat dissipating member is disposed in the first area, the third heat dissipating member is disposed in the first area and close to the second air inlet, the first fan is disposed in the first area and between the light source module and the first heat dissipating member, and the second fan is disposed in the second area and between the electronic assembly and the first heat dissipating member;
wherein the first fan forms a first cooling airflow in the first area, and the first cooling airflow flows into the housing through the first air inlet and then flows to the air outlet, wherein the second fan forms a second cooling airflow in the second area, and the second cooling airflow flows into the housing through the first air inlet and then flows to the air outlet.

22. A projection apparatus, comprising:
a housing, having a first side, a second side, a third side and a fourth side, wherein the first side and the second side are opposite to each other, the third side and the fourth side are opposite to each other, the third side and the fourth side are formed between the first side and the second side, the first side is provided with an air outlet, the second side is provided with a first air inlet, a containing space is defined in the housing and has a first area and a second area adjacent to the first area, the first area is formed close to the third side, the second area is formed close to the fourth side, and the housing is provided with a second air inlet in the first area;
a projection module, disposed in the housing and configured to project an image beam onto a display area, wherein the projection module comprises a light source module;
an electronic assembly, disposed in the housing and electrically connected to the projection module, wherein the electronic assembly is configured to drive the projection module; and
a heat dissipating module, comprising a first heat dissipating member, a second heat dissipating member, a third heat dissipating member, a first fan and a second fan, wherein the first heat dissipating member, the second heat dissipating member and the third heat dissipating member are connected to the light source module, the first heat dissipating member is disposed close to the air outlet, the second heat dissipating member is disposed in the first area, the third heat dissipating member is disposed in the first area and close to the second air inlet, the first fan is disposed in the first area and between the light source module and the first heat dissipating member, and the second fan is disposed in the second area and between the electronic assembly and the first heat dissipating member;
wherein the projection module further comprises:
an optical engine, configured to form an illumination beam from a light emitted from the light source module;
a light valve, disposed on a transmission path of the illumination beam and configured to convert the illumination beam into the image beam; and
a projection lens, disposed on a transmission path of the image beam;
wherein the third side is further provided with a lens opening, the lens opening is located near the second air inlet, the projection lens is close to the first air inlet, and the image beam is projected onto the display area through the lens opening.

23. A projection apparatus, comprising:
a housing, having a first side, a second side, a third side and a fourth side, wherein the first side and the second side are opposite to each other, the third side and the fourth side are opposite to each other, the third side and the fourth side are formed between the first side and the second side, the first side is provided with an air outlet, the second side is provided with a first air inlet, a containing space is defined in the housing and has a first area and a second area adjacent to the first area, the first area is formed close to the third side, the second area is formed close to the fourth side, and the housing is provided with a second air inlet in the first area;
a projection module, disposed in the housing and configured to project an image beam onto a display area, wherein the projection module comprises a light source module;
an electronic assembly, disposed in the housing and electrically connected to the projection module, wherein the electronic assembly is configured to drive the projection module; and
a heat dissipating module, comprising a first heat dissipating member, a second heat dissipating member, a third heat dissipating member, a first fan and a second fan, wherein the first heat dissipating member, the second heat dissipating member and the third heat dissipating member are connected to the light source module, the first heat dissipating member is disposed close to the air outlet, the second heat dissipating member is disposed in the first area, the third heat dissipating member is disposed in the first area and close to the second air inlet, the first fan is disposed in the first area and between the light source module and the first heat dissipating member, and the second fan is disposed in the second area and between the electronic assembly and the first heat dissipating member;
wherein the projection module further comprises:
an optical engine, configured to form an illumination beam from a light emitted from the light source module;

a light valve, disposed on a transmission path of the illumination beam and configured to convert the illumination beam into the image beam; and a projection lens, disposed on a transmission path of the image beam;

wherein the second side is further provided with a lens opening, and the image beam is projected onto the display area through the lens opening.

* * * * *